(12) United States Patent
Lee et al.

(10) Patent No.: US 8,031,770 B2
(45) Date of Patent: Oct. 4, 2011

(54) SYSTEMS AND METHODS FOR OBJECTIVE VIDEO QUALITY MEASUREMENTS

(75) Inventors: Chul-Hee Lee, Seoul (KR); Sang-Woo Rhie, Seoul (KR); Won-Hee Sull, Gyeonggi-do (KR); Dong-Won Na, Gyeonggi-do (KR); Hong-Seo Yun, Gyeonggi-do (KR); Sang-Ho Chae, Gyeonggi-do (KR); Hyun-Joong Park, Seoul (KR); Joong-Yun Lee, Seoul (KR)

(73) Assignees: SK Telecom Co., Ltd., Seoul (KR); Yonsei University, Seoul (KR)

( * ) Notice: Subject to any disclaimer, the term of this patent is extended or adjusted under 35 U.S.C. 154(b) by 1207 days.

(21) Appl. No.: 11/112,500

(22) Filed: Apr. 22, 2005

(65) Prior Publication Data

US 2005/0243910 A1 Nov. 3, 2005

(30) Foreign Application Priority Data

Apr. 30, 2004 (KR) ........................ 10-2004-0030686

(51) Int. Cl.
*H04N 11/02* (2006.01)

(52) U.S. Cl. ......... 375/240.08; 375/240.01; 375/240.25; 375/240.26

(58) Field of Classification Search ............. 375/240.25; 348/61, 161
See application file for complete search history.

(56) References Cited

U.S. PATENT DOCUMENTS

| 5,790,269 | A | * | 8/1998 | Masaki et al. | 358/447 |
| 5,920,356 | A | * | 7/1999 | Gupta et al. | 348/606 |
| 6,704,451 | B1 | * | 3/2004 | Hekstra et al. | 382/199 |
| 6,898,319 | B1 | * | 5/2005 | Hazra et al. | 382/232 |
| 7,423,978 | B2 | * | 9/2008 | Sirivara et al. | 370/252 |
| 2003/0103470 | A1 | * | 6/2003 | Yafuso | 370/282 |

FOREIGN PATENT DOCUMENTS

| JP | 2003-319420 | 11/2003 |
| JP | 2003 319420 | 11/2003 |

OTHER PUBLICATIONS

Sakarya et al., "An evaluation of SAR image compression techniques"; IEEE International Conference on Acoustics, Speech, and Signal Processing, vol. 4, Apr. 21-24, 1997, pp. 2833-2836.*
Korean Office Action for Korean application No. 10-2004-0030686.

* cited by examiner

*Primary Examiner* — Christopher S Kelley
*Assistant Examiner* — Christopher Findley
(74) *Attorney, Agent, or Firm* — Lowe Hauptman Ham & Berner LLP

(57) ABSTRACT

Disclosed herein are systems and methods for evaluating video quality. The systems include a video transmitter and a video receiver. The transmitter generates feature parameters from a reference video to be transmitted and transmits the generated feature parameters along with compressed video data via a network. The video receiver receives the feature parameters and the compressed video data via the network, evaluates the video quality of the received video using the feature parameters and transmits video quality evaluation results to the video transmitter via the network.

22 Claims, 19 Drawing Sheets

Moving edge image(S)

Frame1(*l*)  Frame2(*l*+1)  Frame3(*l*+2) · · ·

Moving image to be evaluated(P)

Reference moving image (color moving image)

Frame1($l$)  Frame2($l+1$)  Frame3($l+2$) ...

Y(Dominant)

Cr

Cb

SYSTEMS AND METHODS FOR OBJECTIVE VIDEO QUALITY MEASUREMENTS

BACKGROUND OF THE INVENTION

1. Field of the Invention

The present invention relates to systems and methods for objective video quality measurements.

2. Description of the Related Art

Video quality measurements are core technologies that are used for development and performance evaluation of new encoding methods. A measure of the video quality is also needed for the evaluation of transmission quality of videos. Consequently, it is becoming more important.

Traditionally, the evaluation of video quality is performed by a number of evaluators who subjectively evaluate the quality of video. However, this approach has several limitations. First, it is time-consuming and expensive. Furthermore, it cannot be done in real time.

In particular, with the development of digital and communication technologies, it is possible to transmit digitized videos through a network. In such a system which transmits videos that are compressed using such digital technologies, it is very important to monitor video quality at the receiving side.

However, in traditional video transmission systems, there have been few methods for the receiver to evaluate video quality. In particular, it is difficult for the transmitter to monitor the video quality at the receiver.

SUMMARY OF THE INVENTION

Accordingly, in order to solve the aforementioned problems occurring in the prior art, the present invention provides systems and methods for objective measurement of video quality, where the transmitting side extracts feature parameters from a reference video and transmits them to the receiving side, and the receiving side evaluates the video quality of the received video using the feature parameters and transmits evaluation results to the transmitting side. Consequently, it is possible for the transmitting side to monitor video quality at the receiver.

In order to accomplish the aforementioned goals, the present invention provides systems for evaluating video quality, including the transmitter which generates feature parameters from the edge video which is produced from a reference video and transmits the generated feature parameter along with a compressed video via a network, and the receiver which receives the feature parameters and the compressed video via the network, evaluates the video quality of the received video using the feature parameters, and transmits evaluation results to the transmitter.

The compressed video can be obtained by applying a compression algorithm to a source video. A source video is used as the reference video in the case where the source video is available. If a source video is not available at the transmitter, a compressed video, which is available at the transmitter, is used as a reference video. In many cases, only compressed videos are available at the transmitting side (content providers, service providers or communication service providers).

In the present invention, the terms "compressed video" and "video data" are used interchangeably. In some cases, the term "compressed video" refers to the video that is obtained by decoding video data. In other words, the compressed video is obtained by decoding the video data (compressed video data). When a clear distinction is required, the terms "compressed video" and "compressed video data (or video data)" will be used. The compressed video is a video sequence obtained by decoding the compressed video data. If no transmission error has occurred, the transmitted compressed video is identical to the received compressed video. On the other hand, if transmission errors have occurred, the transmitted compressed video is different from the received compressed video. It is noted that the transmitted compressed video, which is also referred to as the transmitted video, is a video sequence which is obtained by decoding the transmitted compressed video data. The received compressed video, which is also referred to as the received video, is a video sequence which is obtained by decoding the received compressed video data which may include transmission errors. The terms "video" and "video sequence" will be used interchangeably.

In some cases, a compressed video is provided to the transmitting side and the transmitting side needs to encode the compressed video using different compression methods or at different compression ratios. In this case, the provided compressed video is decoded and the decoded video is encoded again. The decoded video may be used as a reference video if the source video is not available. Furthermore, the provided compressed video may be directly re-encoded using a transcodec.

In the present invention, the term "video" may refer to a source video, a compressed video (video data) obtained by encoding a source video, or a video obtained by decoding a compressed video (video data). Therefore, the term "video" must be interpreted according to the context.

Additionally, the present invention provides methods for evaluating video quality, which include the first step of the receiving side receiving compressed video data and compressed edge video data transmitted via a network; the second step of the receiving side calculating the mean square error for edge pixels between the received video sequence and the edge video sequence; the third step of the receiving side calculating the PSNR for the mean square error; and the fourth step of the receiving side evaluation of video quality based on the PSNR. If registration operation is required for spatial and temporal shifts, the methods may include a registration step which performs registration using the received video and the edge video.

BRIEF DESCRIPTION OF THE DRAWINGS

The objects, features and advantages of the present invention will be more clearly understood from the following detailed description taken in conjunction with the accompanying drawings, in which.

DESCRIPTION OF THE PREFERRED EMBODIMENTS

Detailed description of the preferred embodiments is provided with reference to the drawings.

Figure 1:
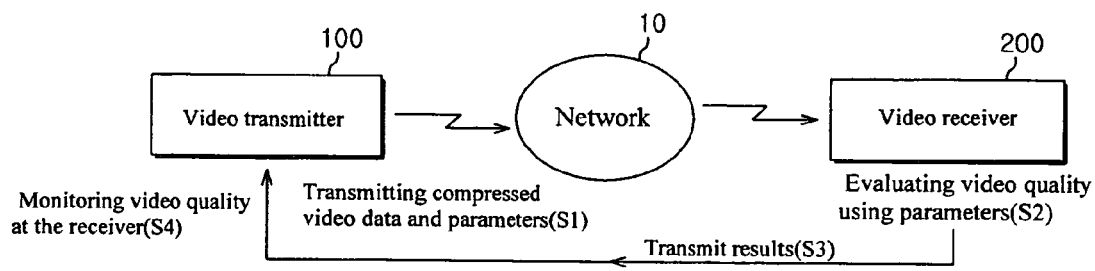
FIG. 1 is a block diagram illustrating a system which evaluates video quality in accordance with the present invention.

FIG. 1 is a block diagram illustrating a system which evaluates video quality in accordance with the present invention.

As shown in FIG. 1, the video quality measurement system of the present invention includes a video transmitter 100 transmitting compressed video data and a video receiver 200 receiving the compressed video data, which is transmitted by the transmitter 100 via a network 10. The network 10 includes both wireless and wired networks, and the video receiver 200 may be a mobile communication terminal.

The video transmitter 100 generates feature parameters from an edge video which is created from a reference video and transmits feature parameters along with compressed video data to the video receiver 200 via the network 10 (step S1).

Then, the video receiver 200 receives the compressed video data and the feature parameters via the network 10 and evaluates the video quality of the received compressed video using the feature parameters (step S2).

Furthermore, the video receiver 200 transmits video quality measurement results to the video transmitter 100 via the network 10 (step S3) and the video transmitter 100 can monitor the video quality at the receiver (step S4).

Figure 2A:
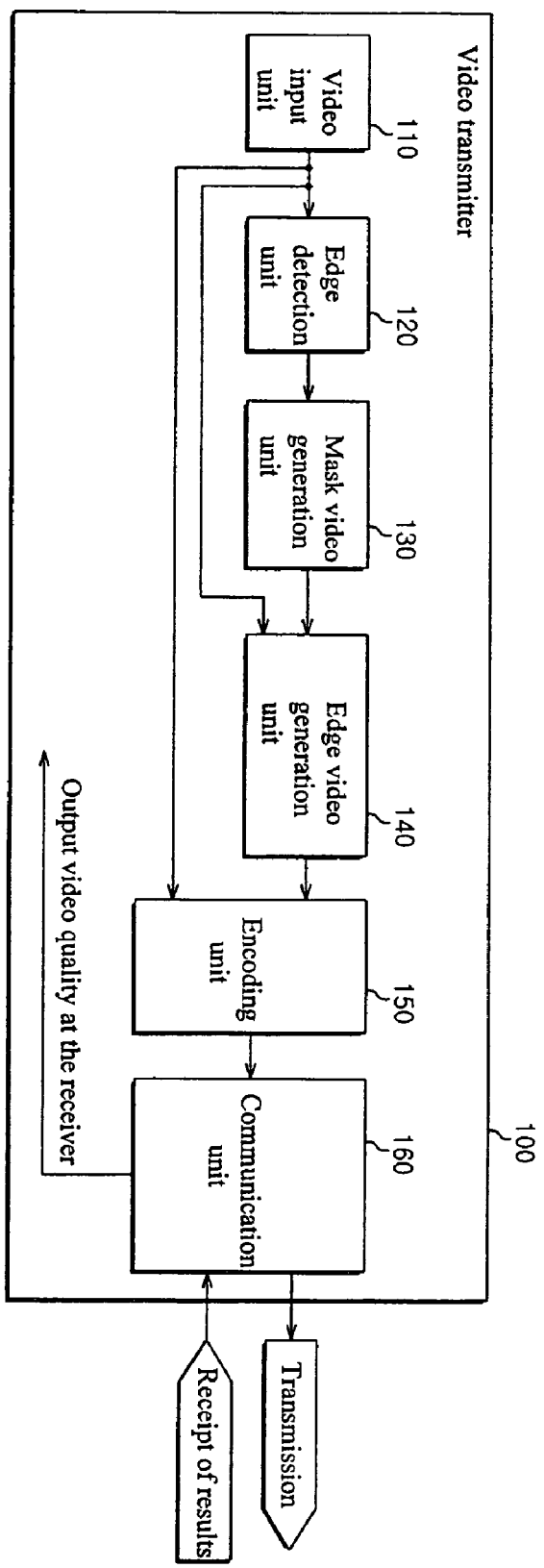
FIGS. 2a and 2b are block diagrams of the transmitter according to the present invention.
Figure 2B:
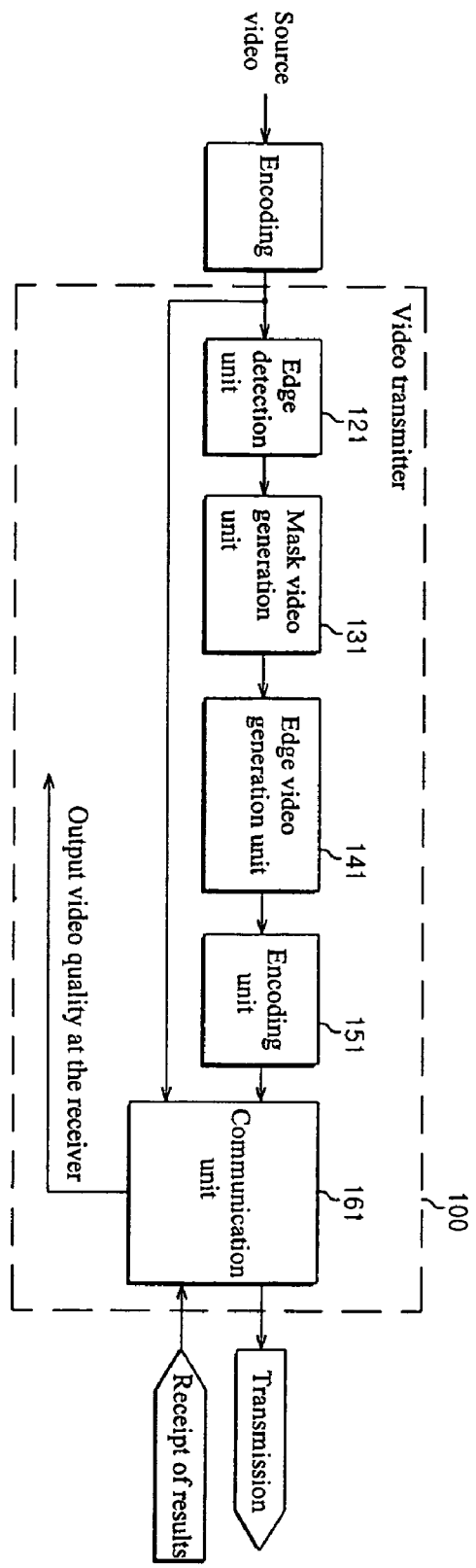

FIGS. 2a and 2b are block diagrams of the transmitter according to the present invention.

FIG. 2a illustrates a transmitter which generates an edge video from a source video and FIG. 2b illustrates a transmitter which generates an edge video from a compressed video.

In FIG. 2a, the video transmitter 100 includes a video input unit 110 which receives a source video, an edge detection unit 120 which extracts edge areas from the source video inputted from the video input unit 110, a mask video generation unit 130 which generates a mask video from the output of the edge detection unit 120, an edge video generation unit 140 which generates an edge video from the output of the mask video generation unit 130 and the source video, an encoding unit 150 which encodes the source video and the edge video generated by the edge video generation unit 140, and a communication unit 160 which transmits encoded video data to the receiver 200 via the network 10.

The video input unit 110 may be a device that receives videos from an external device or a storage device in which videos are previously stored.

In many cases, the transmitting side (content providers, service providers, or communication service providers) does not have source videos and only compressed video data is available. In this case, the edge video can be obtained from compressed video data as shown in FIG. 2b. The compressed video data is first decoded and edge areas are extracted from the decoded video.

In FIG. 2b, the video transmitter 100 includes an edge detection unit 121 which generates a reference video by decoding compressed input video data and extracts edge areas of the reference video, a mask video generation unit 131 which generates a mask video from the output of the mask video generation unit 131, an edge video generation unit 141 which generates an edge video from the output of the mask video generation unit 131 and the reference video, an encoding unit 151 which encodes the edge video generated by the edge video generation unit 141, and a communication unit 161 which transmits the encoded edge video data and the compressed input video data to the video receiver 200 via a network 10.

Since errors should not occur in feature parameters (in the previous example, encoded edge video data), which will be used in video quality measurement it is possible to employ a special encoding technique. Furthermore, since the concurrence of errors in encoded edge video data and encoded video data needs be avoided, it is preferable to transmit encoded edge video data and encoded video data using different channels. Also, encoded edge video data and encoded video data may be transmitted using different packets or can be transmitted with some time difference.

Figure 3A:
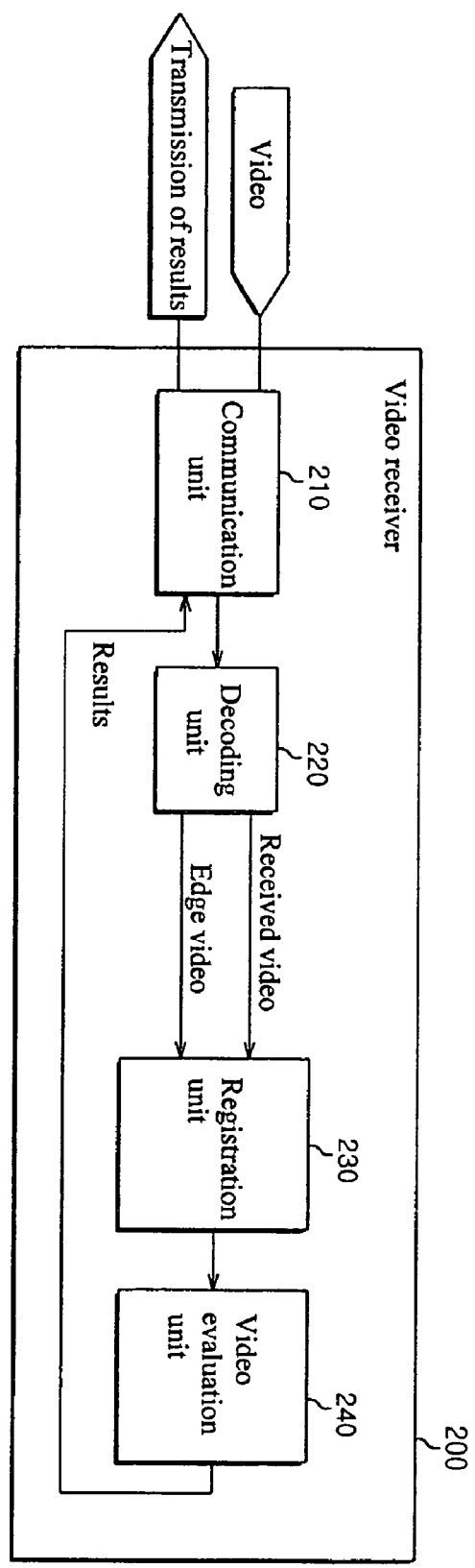
FIGS. 3a and 3b are block diagrams of the receiver according to the present invention.
Figure 3B:
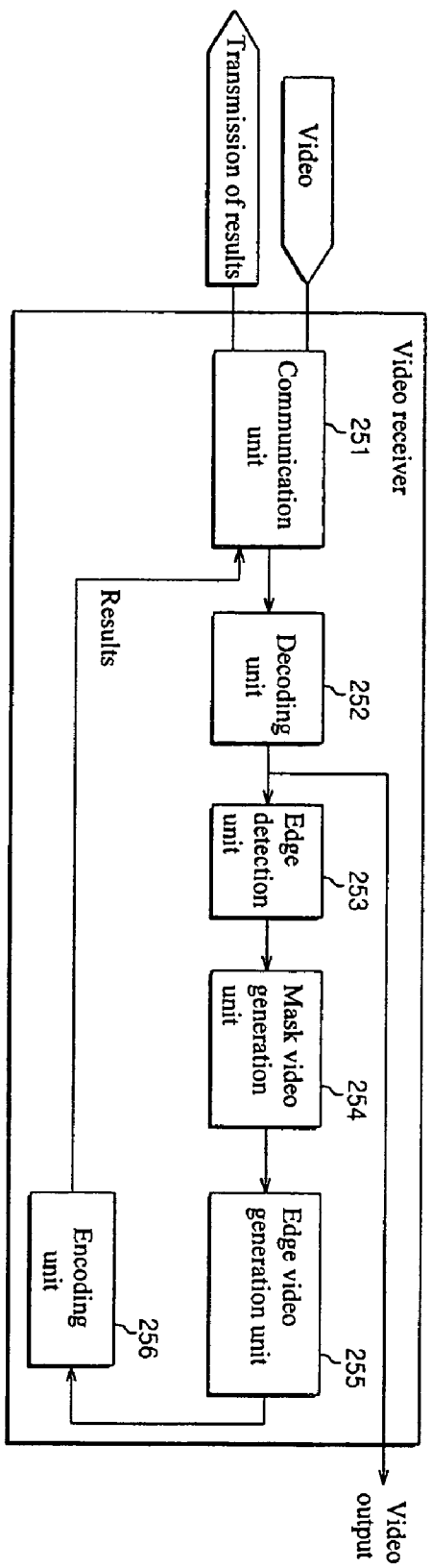

FIGS. 3a and 3b are block diagrams of the receiver according to the present invention;

FIG. 3a shows an embodiment in which the video receiver 200 performs video quality measurement. FIG. 3b shows an embodiment in which the video receiver extracts feature parameters from received video data and transmits them to the transmitting side.

In FIG. 3a, the video receiver according to the present invention includes a communication unit 210 receiving video data (compressed video data) via a network 10, a decoding unit 220 which generates a received video and an edge video by decoding the received video data, a registration unit 230 which spatially and temporally aligns the received video with the edge video decoded, which are outputted by the decoding unit 220, and a video quality evaluation unit 240 which evaluates video quality of the received video using the output of the registration unit 230 (registered received video and edge video) and outputs evaluation results.

The video quality evaluation unit 240 calculates a PSNR (Peak-Signal-to-Noise Ratio) of the edge areas and performs video quality evaluation using the PSNR. In this case, the edge PSNR is referred to as an edge PSNR (hereinafter referred to as the "E-PSNR").

The video quality evaluation unit 240 can notify the transmitting side of video quality status at the receiver by transmitting video quality evaluation results to the video transmitter 100 through the communication unit 210.

In the other case, the video receiver receives compressed video data from the transmitter, extracts feature parameters from the received video, encodes feature parameters and transmits the encoded feature parameters to the video transmitter. Then, using the feature parameters, the video transmitter can monitor the video quality at the receiver. FIG. 3b illustrates this procedure.

In FIG. 3b, the video receiver includes a communication unit 251 receiving video data (compressed video data) via a network 10, a decoding unit 252 which produces a received video by decoding the received video data, an edge detection unit 253 extracting edge areas of the received video outputted by the decoding unit 252, a mask video generation unit 254 generating a mask video from the output of the edge detection unit 253, an edge video generation unit 255 which generates an edge video from the output of the mask video generation unit 254 and the received video, and an encoding unit 256 which encodes the edge video generated by the edge video generation unit 254 and transmits the encoded edge video data through the communication unit 251.

It is also possible that the receiver extracts and transmits parameters only when transmission errors occur. When errors occur in received video data, the video receiver extracts parameters from the erroneous parts of the received video data and transmits the parameters to the transmitter. Then, the transmitter evaluates video quality at the receiver using the parameters.

Furthermore, when a packet error occurs in received video data, the receiver may transmit an erroneous packet to the transmitter, and then the transmitter evaluates the video quality at the receiver using the erroneous packet.

Next, an embodiment of generating a mask video according to the present invention is described.

The vertical horizontal gradient images of a reference image are generated. Then absolute values of the vertical horizontal gradient images are computed. Edge areas are located by extracting pixels in the vertical horizontal gradient images whose values exceed a threshold. In other words, by collecting pixels in the vertical horizontal gradient images whose values exceed a threshold, the edge areas are determined. Detailed description of the procedure will be presented next.

Figure 4:
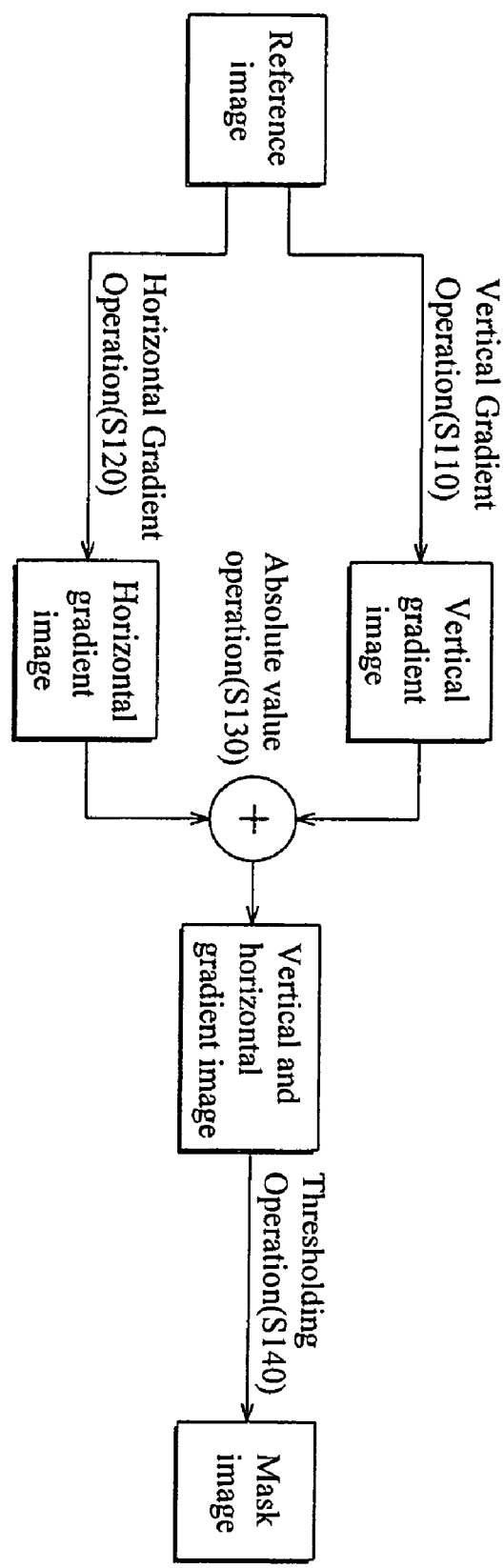
FIG. 4 is a diagram which illustrates the procedure of generating a mask video sequence in accordance with an embodiment of the preset invention.

FIG. 4 is a block-diagram which illustrates how a mask video is generated from a reference image according to the present invention.

In FIG. 4, an edge detection algorithm is applied to find edge areas and a threshold operation is used to determine edge areas.

An edge detection algorithm is applied to find edge areas. Although there are minor differences depending on the choice of edge detection algorithms, any one of the existing methods may be employed. For example, the Sobel gradient operator may be employed to detect edge areas.

Figure 5:
FIG. 5 is an example of a reference image.
Figure 7:
FIG. 7 is an example of the vertical gradient image of the reference image of FIG. 5.

The edge detection unit 120 generates a vertical gradient image $g_{vertical}(i, j)$ by applying a vertical gradient operator to the reference image shown in FIG. 5 (step S110). It is noted that $g_{vertical}(i, j)$ is a pixel of the vertical gradient image, which is obtained by applying a vertical gradient operator to pixel (i, j) of the reference image. The vertical gradient image of FIG. 5 is shown in FIG. 7.

Figure 6:
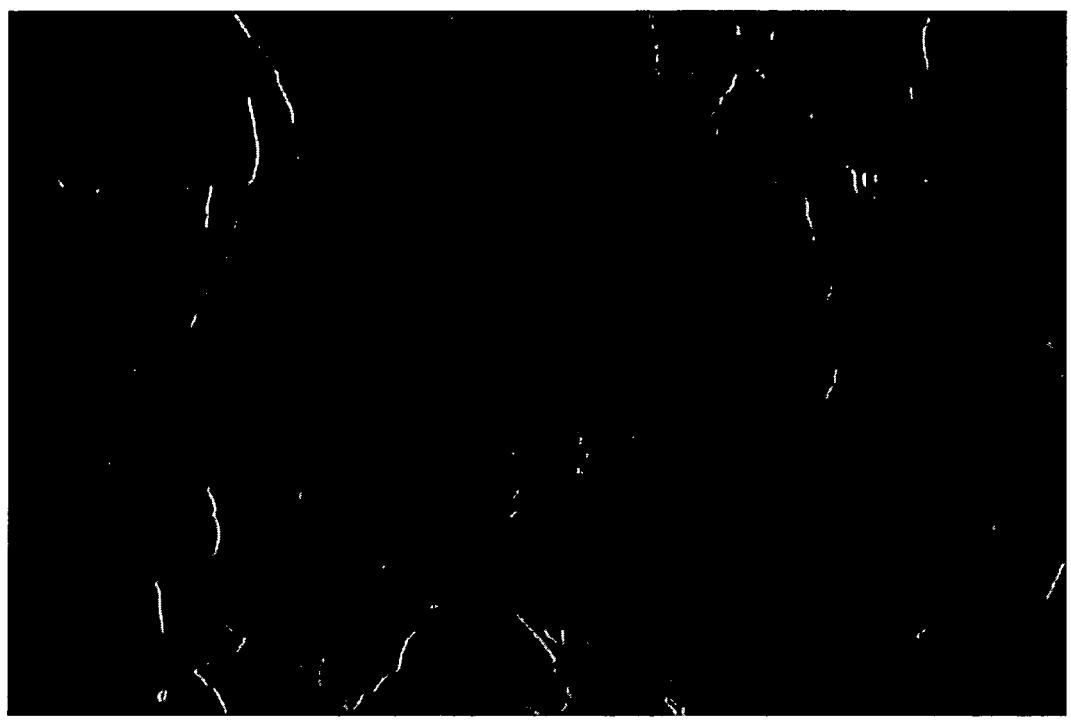
FIG. 6 is an example of the horizontal gradient image of the reference image of FIG. 5.

The edge detection unit 120 generates a horizontal gradient image $g_{horizontal}(i, j)$ by applying a horizontal gradient operation to the reference image (step S120). The horizontal gradient operation can be applied simultaneously with the vertical gradient operation (step S10) or after the vertical gradient operation (step S110). It is noted that $g_{horizontal}(i, j)$ is a pixel of the horizontal gradient image, which is obtained by applying a horizontal gradient operator to pixel (i, j) of the reference image. The horizontal gradient image of FIG. 5 is shown in FIG. 6.

Thereafter, a vertical horizontal gradient image g(i, j) is generated by performing an absolute-value operation on the generated vertical horizontal gradient images (step S130). The vertical horizontal gradient image g(i, j) is obtained by applying the absolute-value operation, computed as follows:

$$g(i,j) = |g_{horizontal}(i,j)| + |g_{vertical}(i,j)|. \qquad (1)$$

Figure 8:
FIG. 8 is an example of a vertical horizontal gradient image according to the present invention.

The vertical horizontal gradient image is shown in FIG. 8. Finally, the mask video generation unit 130 applies threshold operation to the vertical horizontal gradient image g(i, j) and locates edge areas by extracting pixels whose values exceed a threshold value (step S140). The threshold operation is expressed by the following equation:

$$R(i, j) = \begin{cases} 1 & \text{if } g(i, j) \geq t \\ 0 & \text{if } g(i, j) < t \end{cases}$$

R(i, j) is the mask video, g(i, j) is the vertical horizontal gradient image. When t increases, the number of edge pixels in the mask video decreases. The vertical horizontal gradient image can be generated by any other edge detection algorithms.

Figure 9:
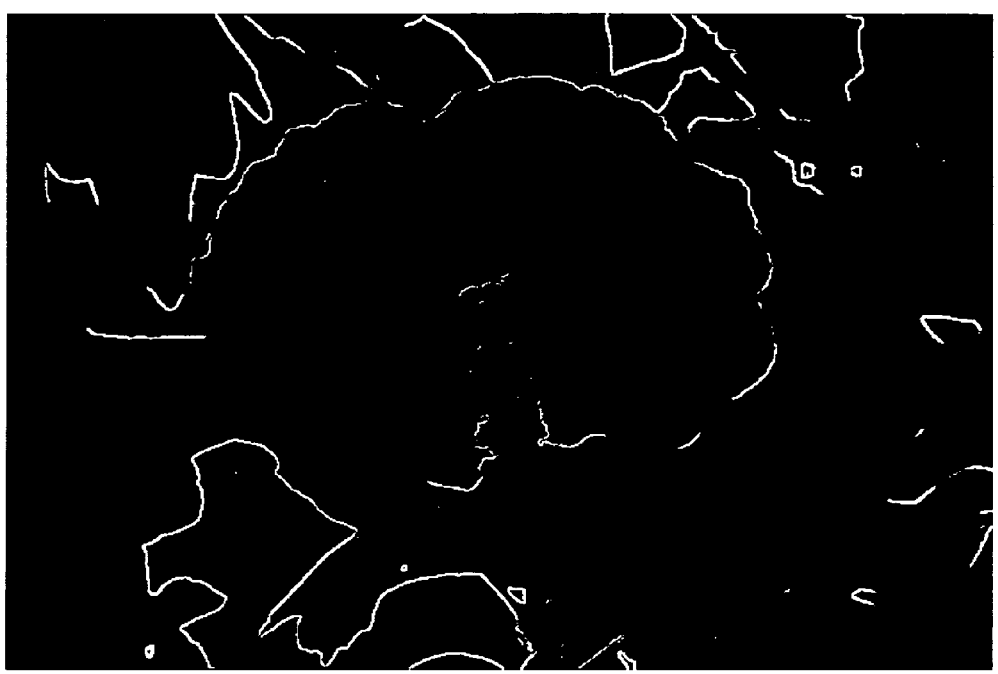
FIG. 9 is an example of the mask image obtained from the vertical horizontal gradient image of FIG. 8.

Thus, at step S140, from the vertical horizontal gradient image g(i, j), only pixels whose pixel values are greater than a threshold value $t_e$ are extracted and these extracted pixels constitute edge areas. FIG. 9 shows an example of such mask videos.

Figure 10:
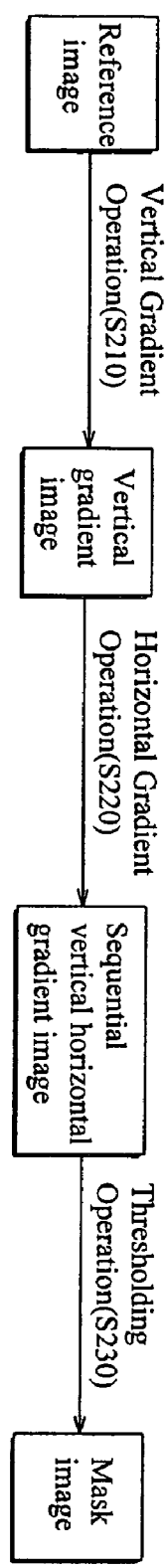
FIG. 10 illustrates another method for generating a mask video according to the present invention.

Although the horizontal and vertical gradient operators have been separately applied to the reference image in the previous embodiment, the modified method of FIG. 10 can be used.

FIG. 10 is a diagram illustrating another method for generating a mask video from a reference image in accordance with the present invention.

Figure 11:
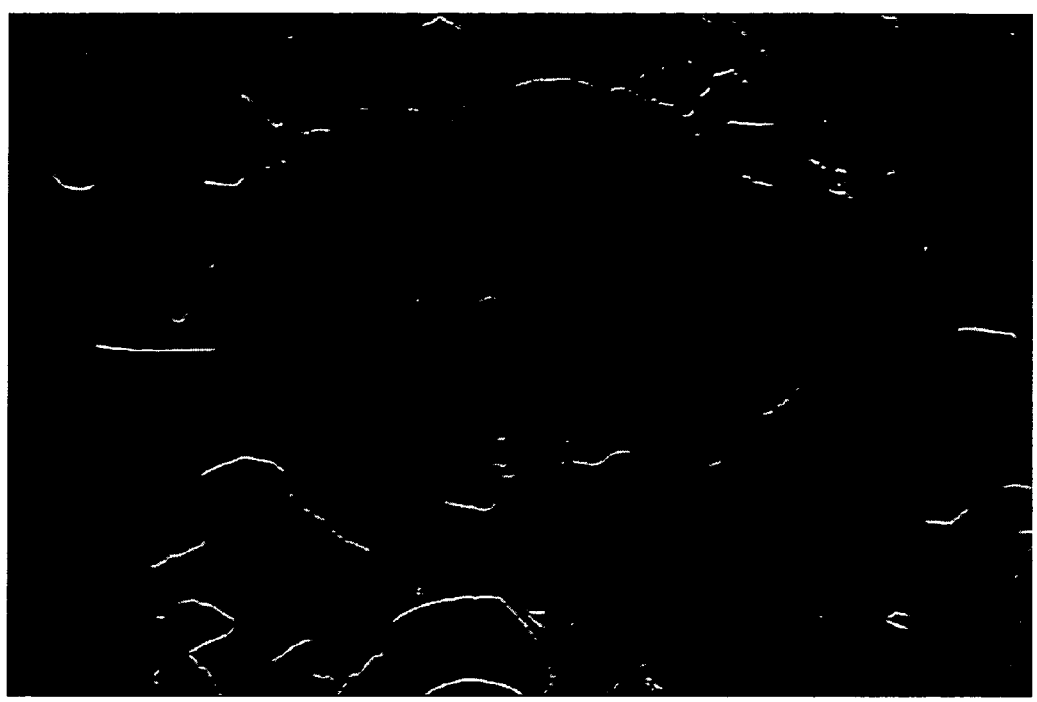
FIG. 11 shows the vertical gradient image of the reference image of FIG. 5.

In FIG. 10, the edge detection unit 120 generates a vertical gradient image by first applying a vertical gradient operator to a reference image (step S210). The resulting vertical gradient image is shown in FIG. 11.

Figure 12:
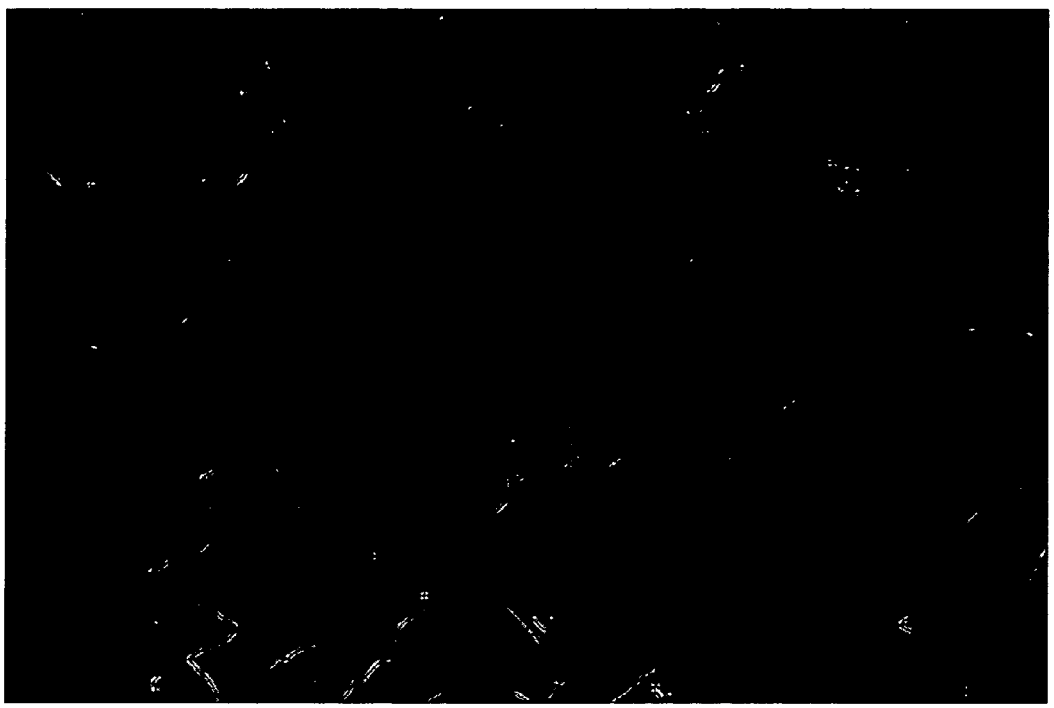
FIG. 12 shows a vertical horizontal gradient image obtained by applying a vertical gradient operation to the image of FIG. 11.

The edge detection unit 120 generates a sequential vertical horizontal gradient image (step S220) by applying a horizontal gradient operator to the vertical gradient image generated at step S210. The sequential vertical horizontal gradient image is shown in FIG. 12.

Although in this embodiment, the vertical gradient image is generated first at step S210 and then the sequential vertical horizontal gradient image is generated by applying a horizontal gradient operation to the vertical gradient image, the order of these operations may be changed.

The sequential vertical horizontal gradient image generated by the edge detection unit 120 is outputted to the mask video generation unit 130 and the mask video generation unit 130 generates a mask image from the sequential vertical horizontal gradient image.

In order to generate the mask image, the mask video generation unit 130 applies a threshold operation to the sequential vertical horizontal gradient image (step S230) and a mask image is obtained, which represents edge areas. The threshold operation is expressed by the following equation:

$$R(i, j) = \begin{cases} 1 & \text{if } g(i, j) \geq t \\ 0 & \text{if } g(i, j) < t \end{cases}$$

where R(i, j) is the mask image, g(i, j) is sequential vertical horizontal gradient image. When t increases, the number of edge pixels in the mask image decreases. As a result, the sizes of the feature parameters, which are to be transmitted, are also reduced.

Although the Sobel gradient operator was used in generating the gradient images of FIGS. 11-12, the sequential vertical horizontal gradient image may be generated by any other edge detection algorithms.

Figure 13:
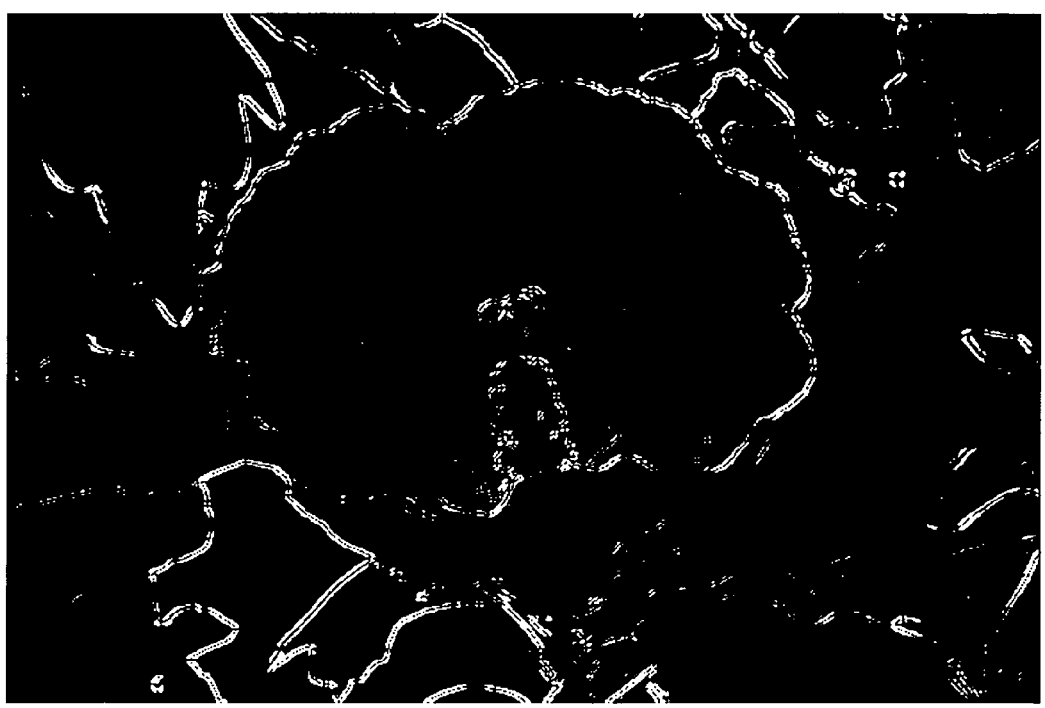
FIG. 13 shows the mask video obtained from the vertical horizontal gradient image of FIG. 12.

Thus, at step S230, from the sequential vertical horizontal gradient image g(i, j), only pixels whose pixel values are greater than a threshold value t are extracted and these extracted pixels constitute edge areas. FIG. 13 shows an example of such mask images.

The two edge detection algorithms described in the previous embodiments may be selectively employed according to the characteristics of video compression algorithms. Furthermore, similar edge detection methods may be employed.

The two gradient images generated by the two methods according to the present invention are shown in FIGS. 8 and 12. By applying threshold operation to FIGS. 8 and 12, pixels whose pixel values are greater than a threshold value are extracted as edge areas and mask images are obtained, which are shown in FIGS. 9 and 13. Then, an edge image can be obtained by substituting non-zero pixels of a mask image with the corresponding pixels of reference or processed images. Since images are composed of frames or fields, an edge image can be obtained by applying the aforementioned method to either individual frame or field.

Thus, in edge images, the pixels in edge areas have the original pixel values and pixels in non-edge areas are replaced with a pre-specified value. Although zero value may be used as a pixel value for non-edge pixels, it is possible that an edge pixel also has zero pixel value. In order to avoid such a problem, a special value such as a negative value may be employed.

Although the mask image in the present invention is obtained by applying an edge detection algorithm to the reference image, the mask image can be obtained from a processed image, which is processed by a certain algorithm. These methods can be selectively employed depending on applications. In other words, the reference video may be a source video or compressed (processed) video.

Meanwhile, in order to evaluate the quality of received videos, the video quality evaluation unit 240 calculates the E-PSNR and evaluates video quality based on the E-PSNR. Next, the computation process of the E-PSNR is described.

Next, a procedure for calculating the mean square error (MSE) of edge areas between the edge video sequence and the processed video sequence is described below. It is noted that the edge video sequence is generated from the source video sequence in this case.

Figure 14:
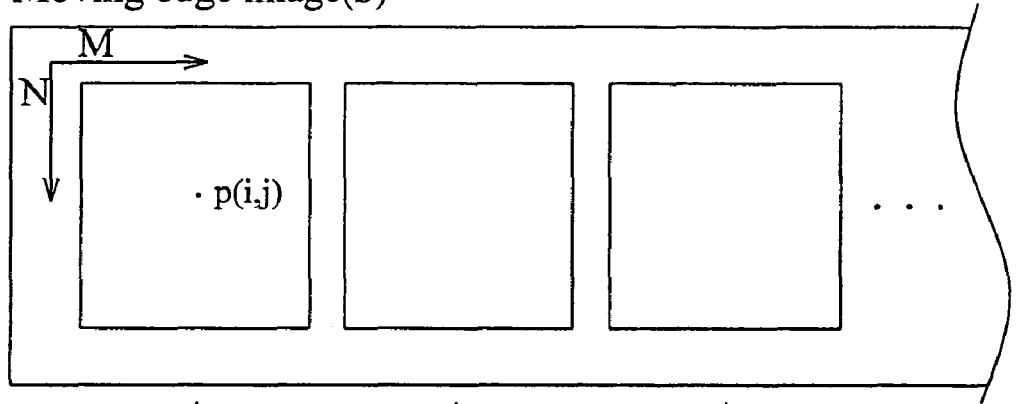
FIG. 14 illustrates an application of the objective video quality measurement method according to the present invention.
Figure 14:
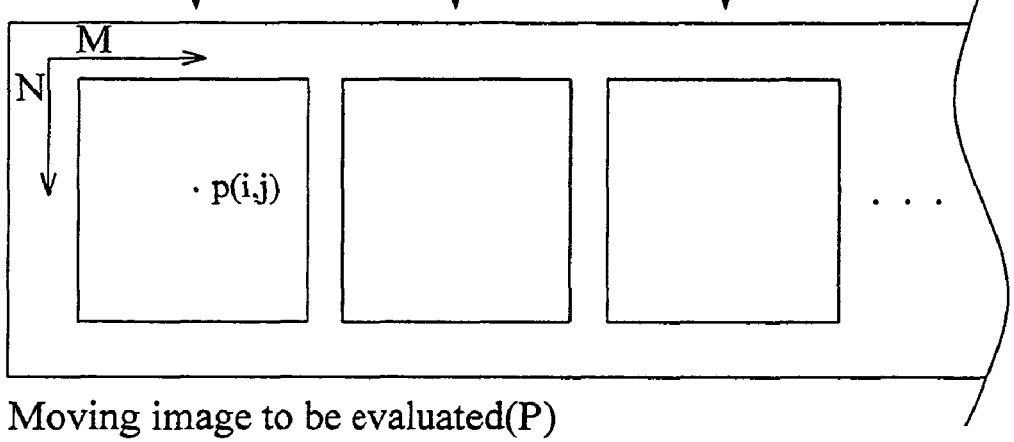

FIG. 14 is a diagram illustrating how the video quality evaluation method according to the present invention is applied to video sequences.

In FIG. 14, an edge video S, which is generated from a source video, and a processed video P, whose video quality is to be evaluated, are composed of a plurality of frames or fields (1, 1+1, 1+2, . . . ). In the following description, it is assumed that an edge video S and a processed video P are composed of a plurality of frames. Each frame has M rows and N columns and each pixel(P) is represented by P(i, j).

Accordingly, the video quality evaluation unit 240 calculates the error in the edge areas of the 1-th frame using the following equation:

$$se_e^l = \sum_{i=1}^{M} \sum_{j=1}^{N} \{S^l(i, j) - P^l(i, j)\}^2 \quad (2)$$

where the summation is performed only when $S^l(i, j)$ belongs to the edge areas $S^l(i, j)$: the pixel at (i, j) of 1-th image (frame) of the edge video sequence $P^l(i, j)$: the pixel at (i, j) of 1-th image (frame) of the processed video sequence M: number of rows N: number of columns In Equation (2), when the square error between the edge video sequence and the received video sequence are calculated, the summation is performed using only the pixels corresponding to edge areas. When the edge video is generated, a special value can be assigned to non-edge pixels so that it can be easily determined whether a pixel belongs to edge areas.

As described in conjunction with FIG. 2, the transmitter (transmitting side) encodes the edge video for efficient bandwidth use. In this case, a general video encoding algorithm may be employed. Alternatively, a video compression algorithm, which is specially developed by taking into account the characteristics of edge videos, may be used.

For example, when the number of edge pixels is small, the information on the locations and pixel values of edge pixels may be encoded and transmitted. In any case, when the encoded video data is decoded, it can be easily determined whether a pixel belongs to edge areas and Equation 2 is computed.

If registration in the spatial and temporal domains is required, registration can be performed using the edge video. The spatial and temporal shifts can be determined using the edge pixels of the edge video. A conventional registration algorithm may be used. Since temporal shifts such as time delay or jitter may vary with time, temporal registration can be performed at a certain time interval.

In order to calculate the mean square error between the reference video sequence and the processed video sequence using the result of Equation 2, Equation 3 is used. As a variation of Equation 2, it is possible to use absolute differences instead of the squared error.

After the squared error is computed for all the frames of the video sequences, the edge MSE is calculated as follows:

$$mse_e = \frac{1}{K} \sum_{l=1}^{L} se_e^l \quad (3)$$

where K is the number of all edge pixels and L is the number of frames.

The E-PSNR of edge areas is calculated as follows:

$$EPSNR = 10\log_{10}\left(\frac{P^2}{mse_e}\right) \quad (4)$$

P is the maximum pixel value.

Then, the video quality evaluation unit 240 uses the data as a measurement criterion for evaluating video quality.

Next, the application of the present invention to color videos is described.

Figure 15:
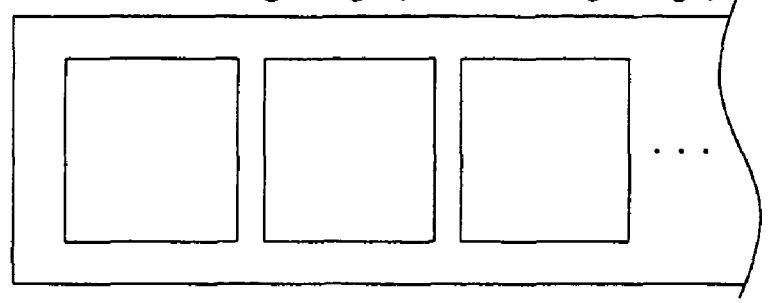
FIG. 15 illustrates how the objective video quality measurement method can be applied to color videos.
Figure 15:
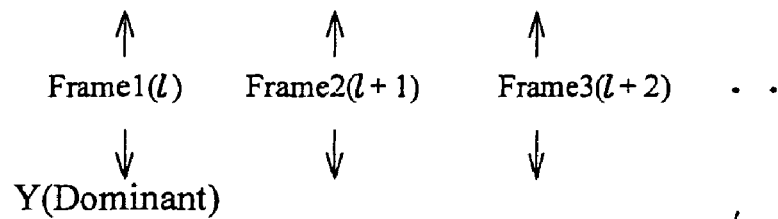
Figure 15:
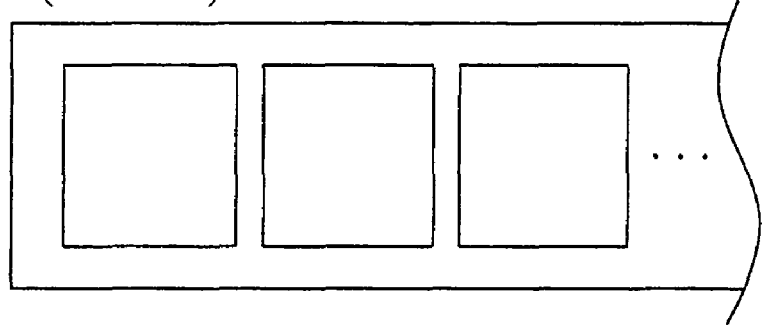
Figure 15:
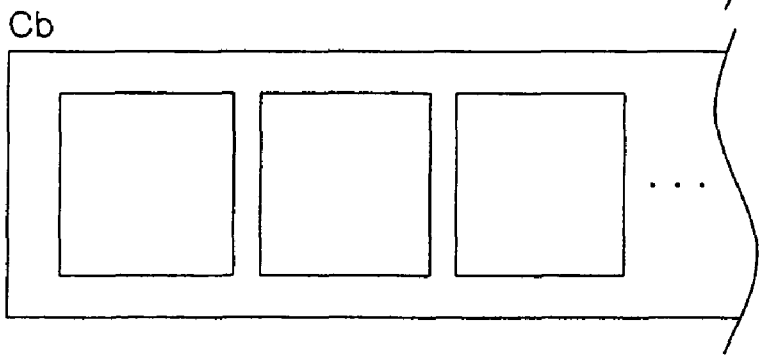

FIG. 15 is a diagram illustrating an example in which the video quality evaluation method of the present invention is applied to a color video.

Most color videos can be represented by three color components in the RGB, YUV or $YC_rC_b$ format. The YUV format can be converted to the $YC_rC_b$ format through the application of scaling and offset. In this case, Y represents a luminance component, and U and V (Cr or $C_b$) represents chrominance information.

For color videos, the objective video quality measurement method of the present invention is applied to each color component and the average is used as a criterion for evaluating video quality. Alternatively, the method is applied just to the Y-component, which is the most dominant component and the object of the present invention can be achieved.

For example, the E-PSNR is calculated for the most dominant component of color videos. Then, the E-PSNR of the most dominant component is modified using the E-PSNRs of the remaining components. In other words, the final VQM (video quality metric) can be calculated as follows:

$$VQM = EPSNR_{do\ min\ ant} + f(EPSNRcomp_2, EPSNR_{comp3})$$

where $EPSNR_{comp2}$ and $EPSNR_{comp3}$ are the E-PSNRs of the remaining components (functions of two variables: x and y).

The function $f(x, y)$ can be a linear function. Then, $f(EPSNR_{comp2}, EPSNR_{comp3})$ can be expressed as $\alpha EPSNR_{comp2} + \beta EPSNR_{comp3}$ where $\alpha$ and $\beta$ are coefficients.

In this case, VQM can be expressed as $EPSNR_{do\ min\ ant} + \alpha EPSNR_{comp2} + \beta EPSNR_{comp3}$ and the coefficients $\alpha$ and $\beta$ can be obtained from training data.

In most video compression standards such as MPEG 1, MPEG 2, MPEG 4 and H.26x, color videos are represented in the $YC_rC_b$ format and the component Y is the most important component.

In a preferred embodiment of the present invention, the $EPSNR_{do\ min\ ant}$ is calculated for the component Y, and the $EPSNR_{comp2}$ and the $EPSNR_{comp3}$ are calculated for the remaining components, that is, U and V, or $C_r$ and $C_b$. In the RGB format, VQM may be calculated with equal or different weights.

Next, the complete procedure of evaluating video quality according to the present invention is described.

Figure 16:
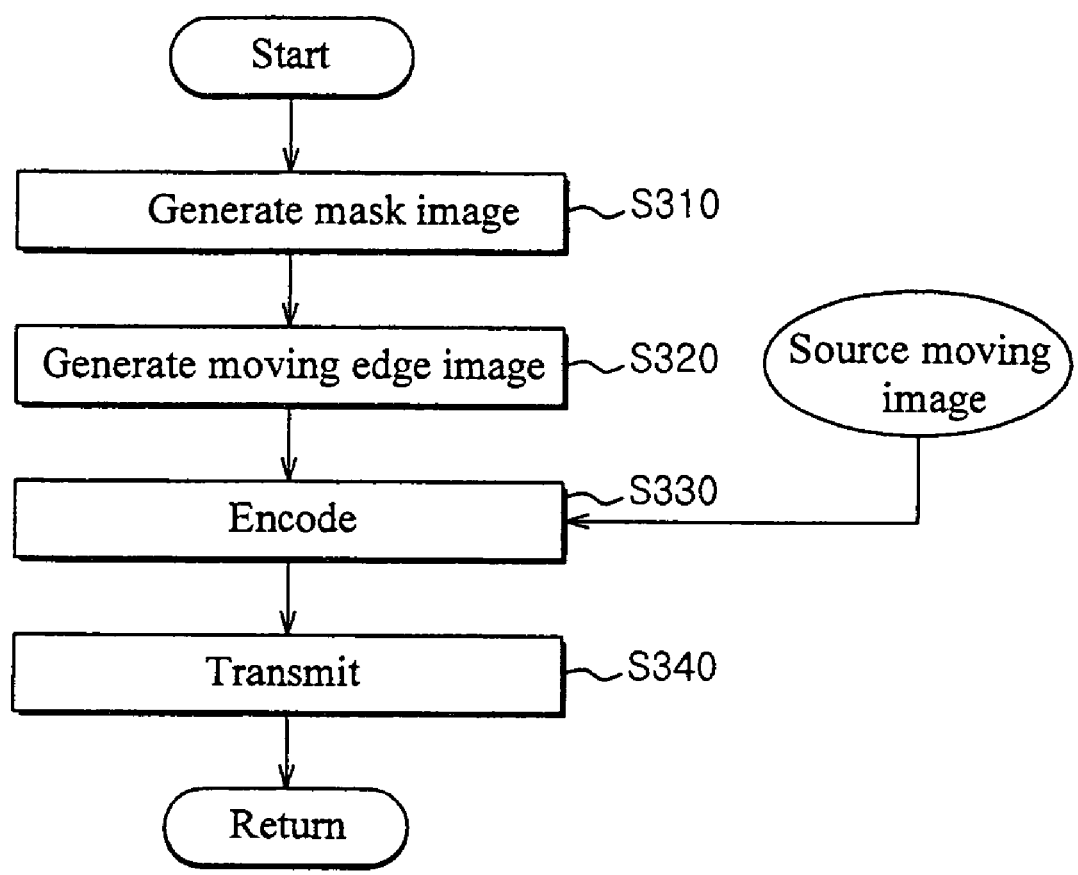
FIG. 16 is a flowchart illustrating the operation of the video transmitter according to the present invention.
Figure 17:
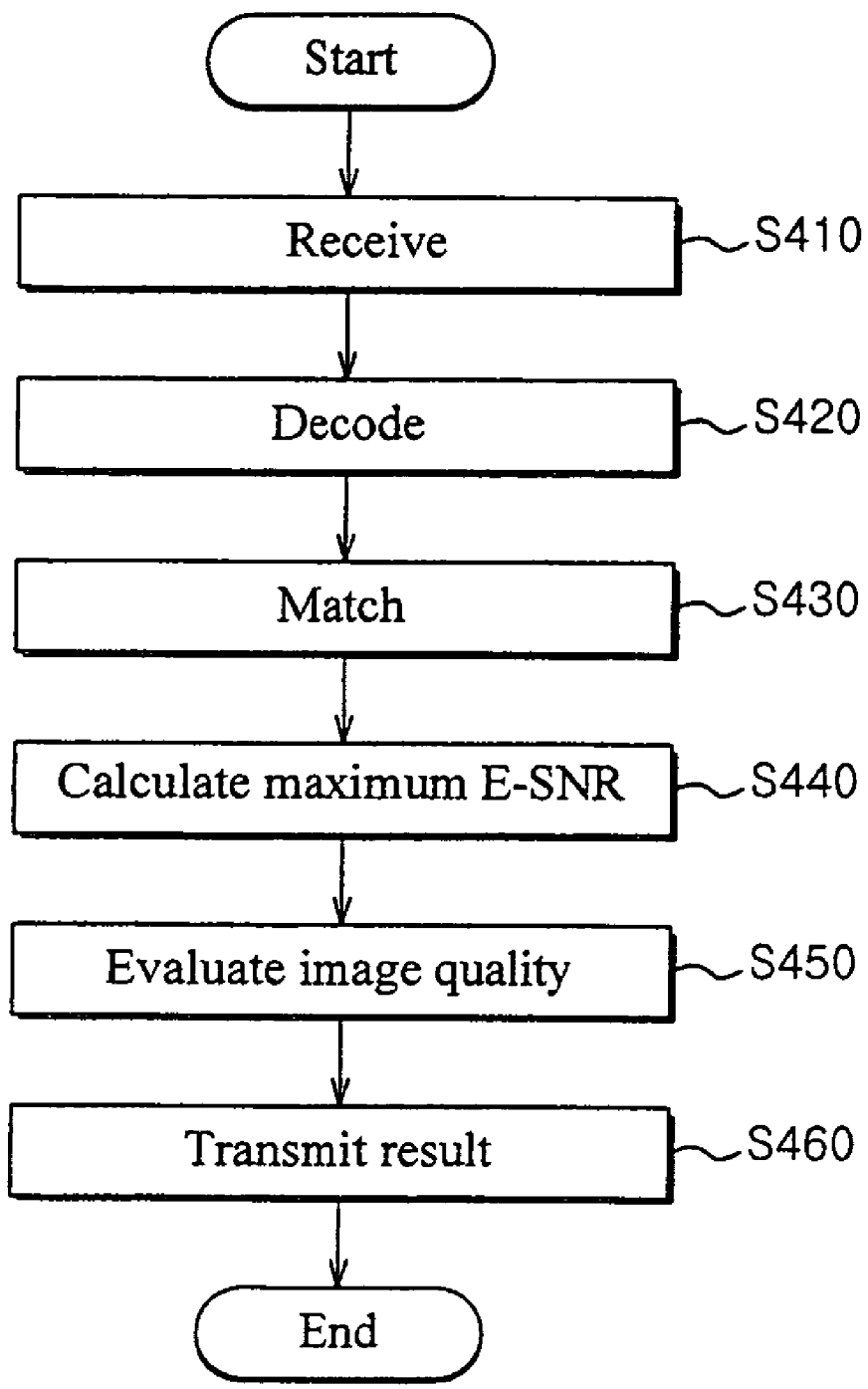
FIG. 17 is a flowchart illustrating the operation of the video receiver according to the present invention.

FIG. 16 is a flowchart illustrating a procedure in the video transmitter according to the present invention FIG. 17 is a flowchart illustrating a procedure in the video receiver according to the present invention.

In FIG. 16, the video transmitter 100 of the present invention extracts edge areas from a reference video, which is inputted from the video input unit 110, by the edge detection unit 120. Thereafter, the mask video generation unit 130 generates a mask video (step S310).

After the mask video has been generated at step S310, an edge video is generated by the edge video generation unit 140 at step S320. The edge video generation unit 140 generates the edge video by performing the logical AND operation on the mask video, which is generated by the mask video generation unit 130, and the reference video.

The edge video is generated by substituting non-zero pixels (pixel value "1") of the mask video with the corresponding pixels of the reference video. Although zero may be used as a pixel value for representing non-edge pixels in the edge video, an edge pixel may also have zero ("0"). In order to avoid this problem, a special value other than zero may be used to represent non-edge pixels. Since a very small portion of the edge video may belong to edge areas, the locations of pixel values of edge areas of the reference video may be encoded.

The edge video is encoded by the encoding unit 150 (step S330) and is used as feature parameters for evaluating video quality. In order to reduce data size, various compression algorithms may be used. Furthermore, the encoding unit 150 also encodes the reference video and then outputs it to the communication unit 160. If the reference video has already been encoded, it is possible to transmit the reference video without encoding. In other words, if a compressed video, which has already been encoded, is provided to the transmitting side, the compressed video is transmitted without further encoding. The communication unit 160 transmits the encoded data to the network 10 (step S340).

Furthermore, since errors must not occur in feature parameters that will be used to evaluate video quality, a special encoding technique may be employed. Furthermore, since the concurrence of errors in encoded edge video data and encoded video data needs be avoided, it is preferable to transmit encoded edge video data and encoded video data using different channels. Also, encoded edge video data and encoded video data may be transmitted using different packets or can be transmitted with some time difference.

In general, though the transmitting side is provided with compressed video data. In some cases, the transmitter (content providers, service providers, or communication service providers) needs to compress video using a different compression method or at a different compression rate. In this case, a reference (source) video may be generated by decoding compressed video data and the reference video may be encoded again. Alternatively, a compressed video may be directly re-encoded using a transcodec.

Accordingly, the video receiver 200 can receive video data (compressed video), which is transmitted at step S340 through the network 10. FIG. 17 illustrates the operation of the receiver.

The video receiver 200 of the present invention receives video data through the communication unit 210 (step S410). The video data received by the communication unit 210 is decoded by the decoding unit 220 (step S420), producing a received video and a received edge video.

If necessary, spatial and temporal registration is performed for the two decoded videos (received video and received edge videos). Thereafter, the two videos are outputted to the video quality evaluation unit 240 (step S430). Then, the video quality evaluation unit 240 calculates an E-PSNR (step S440) and evaluates video quality according to a preset criteria based on the E-PSNR (step S450). Thus, in accordance with the present invention, when registration in the temporal and spatial domains is necessary, registration is performed using the received edge video.

After the video quality of the received video is measured, the video receiver 200 transmits the output of the video quality evaluation unit 240 to the video transmitter 100 through the communication unit 210 (step S460). As a result, the video transmitter 100 can monitor the video quality at the receiver.

Although in the aforementioned embodiments, the transmitter extracts feature parameters and transmits them to the receiver, the reverse case is possible.

The receiver receives compressed video data from the transmitter and extracts feature parameters from the received video just as the transmitter in FIG. 3b extracts feature parameters from the reference video. Then, the receiver transmits them to the transmitter. Finally, the transmitter receives the feature parameters and monitors the video quality at the receiver using the feature parameters.

In digital communication, it is possible to detect errors which occur during transmission in many cases. Transmission errors that may occur in digital communication include packet loss, bit errors, time delay, and jitter. If there is no error during the transmission, the video quality of the received video at the receiver is the same as the video quality of the transmitted video at the transmitter. Furthermore, if the transmitter is informed that no error has occurred during the transmission by the receiver, the transmitter knows that the video quality at the receiver is the same as that of the video transmitted from the transmitter.

Furthermore, in digital communication, the receiver extracts feature parameters from the portion of videos affected by an error and transmits the feature parameters to the transmitter. By sending feature parameters only when errors have occurred, the channel bandwidth of the network can be efficiently used.

When data is transmitted on packet basis, in many cases it is impossible to correct errors when errors occur. However, error occurrence itself can be detected. In this case, the receiver transmits information about packet error and packet loss, including contaminated packets. By using the information, the transmitter is able to monitor the video quality at the receiver.

In other words, the transmitter can precisely reconstruct the videos received by the receiver using the packet error information including contaminated packets. Then the transmitter can easily monitor the video quality at the receiver by comparing the reconstructed video with the reference video. Furthermore, if necessary, the receiver can also transmit to the transmitter various error information which includes packet loss, bit error, time delay, jitters etc.

Since an error must not occur in parameter data that will be used to evaluate video quality, it is possible to transmit the data after encoding the data using a special encoding technique. Furthermore, since the concurrence of errors in encoded edge video data and encoded video data needs be avoided, it is preferable to transmit encoded edge video data and encoded video data using different channels. Also, encoded edge video data and encoded video data may be transmitted using different packets or can be transmitted with some time difference.

As described in details, in accordance with the systems and methods for evaluating video quality, feature parameters, which are used to evaluate video quality, are extracted from a reference video and the extracted feature parameters are transmitted along with compressed video data, so that the receiver can evaluate the video quality using the feature parameters. Furthermore, the receiver transmits the result of the video quality evaluation to the transmitter so that the transmitter can monitor the video quality at the receiver.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for evaluating video quality of a transmitted video sequence, comprising:
 a transmitter configured to generate feature parameters from an inputted reference video sequence and transmit the feature parameters and encoded video data via a network, wherein the transmitter comprises:
 a video input unit for inputting a reference video sequence;
 an edge detection unit for extracting edge pixels from the reference video sequence inputted to the image input unit;
 an edge video generation unit for generating an edge video sequence from an output of the edge detection unit, wherein the pixels in edge areas of the edge video sequence have an original pixel value of the reference video sequence;
 an encoding unit for encoding the reference video sequence and generate an encoded video data;
 an edge video encoding unit for encoding the edge video sequence to include feature parameters comprising information on the original edge pixel values along with their location information; and
 a communication unit configured to transmit the encoded video data separate from the encoded edge video data to a network and to receive a video evaluation report result from the network.

2. The system according to claim 1, further comprising:
 a receiver receiving the feature parameters and the encoded video data via the network, evaluating video quality of the transmitted video sequence using the feature parameters, and transmitting a quality evaluation result to the transmitter via the network.

3. The system according to claim 1, wherein the video input unit is either an input device receiving the reference video sequence or a storage device previously storing the reference video sequence.

4. The system according to claim 1, wherein the edge detection unit is configured to extract edge pixels by applying an edge detection algorithm based on a gradient operation to the reference video sequence and assigns a predetermined non-edge value to pixels whose output values are smaller than a preset threshold value, and a predetermined edge value to pixels whose output values are not smaller than the preset threshold value.

5. The system according to claim 4, wherein the edge detection unit controls the number of the edge pixels by adjusting the threshold value.

6. The system according to claim 1, further comprising:
 a receiver including:
 a communication unit configured to receive the transmitted encoded video data and feature parameters;
 a decoding unit configured to receive an output of the communication unit and generate a received video sequence and an edge video sequence by decoding the encoded video data and the feature parameters;
 a registration unit configured to perform spatial and temporal registration of the received video sequence and the edge video sequence;
 a video quality evaluation unit configured to evaluate the quality of the received video sequence using the edge video sequence; and
 a transmitting unit configured to transmit the evaluation result to the transmitter.

7. The system according to claim 6, wherein the video quality evaluation unit of the receiver calculates an edge peak signal-to-noise ratio (E-PSNR) between the aligned edge pixels of the received video sequence and edge video sequence as follows:

$$EPSNR = 10\log_{10}\left(\frac{P^2}{mse_e}\right)$$

where P is the maximum pixel value,
where $$mse_e = \frac{1}{K}\sum_{l=1}^{L} se_e^l$$

where K is the number of the edge pixels used in the calculation and L is the number of the images of the edge video sequence, where $$se_e^l = \sum_{i=1}^{M} \sum_{j=1}^{N} \{E^l(i, j) - P^l(i, j)\}^2$$

where adding is performed only when $E^l(i, j)$ is an edge pixel and the corresponding pixel exists in the received video sequence, $E^l(i, j)$ is a pixel value at $(i, j)$ of the l-th image of the edge video sequence, $P^l(i, j)$ is a pixel value at $(i, j)$ of l-th image of the received video sequence, M is the number of rows, and N is the number of columns.

8. A system for evaluating quality of a video sequence, comprising:
a receiver further comprising:
a communication unit configured to receive an encoded video data and feature parameters, the feature parameters including original pixel values of edge pixels of a reference video sequence along with their location information within the reference video sequence, which a transmitter encodes to generate the encoded video data, via a network,
a decoding unit configured to generate a received video sequence and an edge video sequence by decoding the encoded video data and the feature parameters,
a registration unit configured to perform spatial and temporal registration of the received video sequence with the edge video sequence, and
a video quality evaluation unit configured to evaluate the quality of the received video sequence using the received video sequence and the edge video sequence that have been registered with each other, and transmitting an evaluation result to the transmitter through the communication unit.

9. The system according to claim 8, wherein the video quality evaluation unit calculates an edge peak signal-to-noise ratio (E-PSNR) between the aligned edge pixels of the edge video sequence and the corresponding pixels of the aligned received video sequence as follows:

$$EPSNR = 10\log_{10}\left(\frac{P^2}{mse_e}\right)$$

where P is the maximum pixel value,
where $$mse_e = \frac{1}{K}\sum_{l=1}^{L} se_e^l$$

where K is the number of the edge pixels used in the calculation and L is the number of the images of the edge video sequence, where $$se_e^l = \sum_{i=1}^{M} \sum_{j=1}^{N} \{E^l(i, j) - P^l(i, j)\}^2$$

where adding is performed only when $E^l(i, j)$ is an edge pixel and the corresponding pixel exists in the received video sequence, $E^l(i, j)$ is a pixel value at $(i, j)$ of the l-th image of the aligned edge video sequence, $P^l(i, j)$ is a pixel value at $(i, j)$ of l-th image of the aligned received video sequence, M is the number of rows, and N is the number of columns.

10. The system according to claim 8, further comprising:
a transmitter which comprises
an image input unit for inputting a reference video sequence;
an edge detection unit for extracting edge pixels from the reference video sequence inputted to the image input unit;
an image encoding unit for encoding the reference video sequence to an encoded video data;
a feature encoding unit for encoding the pixel values and locations of the edge pixels to feature parameters which comprise the information on the edge pixel values along with their location information; and
a communication unit for transmitting the encoded video data and the feature parameters to a network.

11. The system according to claim 10, wherein the edge detection unit uses a gradient operator for extracting the edge pixels.

12. A method of evaluating a video sequence, comprising:
a first step of a receiver receiving from a transmitter an encoded video data and feature parameters which contain information on original edge pixel values along with edge pixel location information within a reference video sequence, which the transmitter encodes to generate the encoded video data;
a second step of the receiver generating a received video sequence from the encoded video data and an edge video sequence from the feature parameters;
a third step of the receiver calculating a mean square error between the edge pixels of the edge video sequence and corresponding pixels of the received video sequence;
a fourth step of the receiver calculating an edge peak signal-to-noise ratio from the mean square error;
a fifth step of the receiver performing a video quality evaluation based on the edge peak signal-to-noise ratio and generating an evaluation report; and
a sixth step of the receiver transmitting the evaluation result to the transmitter.

13. The method according to claim 12, wherein the fourth step calculates the EPSNR as follows:

$$EPSNR = 10\log_{10}\left(\frac{P^2}{mse_e}\right)$$

where P is the maximum pixel value,
where $$mse_e = \frac{1}{K}\sum_{l=1}^{L} se_e^l$$

where K is the number of the edge pixels used in the calculation and L is the number of frames of the edge video sequence,
where $$se_e^l = \sum_{i=1}^{M} \sum_{j=1}^{N} \{E^l(i, j) - P^l(i, j)\}^2$$

where adding is performed only when $E^l(i, j)$ is an edge pixel and the corresponding pixel exists in the received video sequence, $E^l(i, j)$ is a pixel value at $(i, j)$ of the l-th image of the edge video sequence, $P^l(i, j)$ is a pixel value at $(i, j)$ of l-th image of the received video sequence, M is the number of rows, and N is the number of columns.

14. The method according to claim 12, wherein before the first step performed by the receiver, the transmitter performs in sequence, the steps of:
extracting edge pixels by applying an edge detection algorithm to the reference video sequence;
encoding the pixel values and locations of the edge pixels to feature parameters which contain the information on the edge pixel values along with their location information; and
transmitting the feature parameters via a network.

15. The method according to claim 14, wherein the step of extracting edge pixels is performed in such a way as to extract edge pixels by performing vertical and horizontal gradient operations on the reference video sequence and performing absolute value operations on results of the gradient operations.

16. The method according to claim 14, wherein the step of extracting the edge pixels is performed in such a way as to extract the edge pixels by sequentially performing vertical and horizontal gradient operations on the reference video sequence.

17. The method according to claim 12, wherein between the second step and the third step, the receiver performs the step of:
performing spatial and temporal registration of the received video sequence with the edge video sequence.

18. The method of claim 12, wherein in the first step, the feature parameters received from a transmitter include original edge pixel values of a reference video sequence.

19. A method of evaluating quality of a video sequence, comprising:
a first step of the transmitter extracting edge pixels of a reference video sequence by applying an edge detection algorithm to the reference video sequence;
a second step of the transmitter encoding original pixel values of the reference video sequence and locations of the edge pixels to generate an edge video sequence;
a third step of the transmitter encoding the reference video sequence to an encoded video data and
a fourth step of the transmitter separately transmitting the encoded video data and the encoded edge video sequence via a network.

20. The method of evaluating quality of a video sequence, accordingly claim 19, wherein the second step comprises:
generating a mask video; and
generating an edge video by performing a logical AND operation of the mask video and the reference video.

21. A system for evaluating quality of a video sequence, comprising:
a transmitter which comprises a video input unit for inputting a reference video sequence;
an edge detection unit for extracting edge pixels from the reference video sequence inputted to the video input unit;
a video encoding unit for encoding the reference video sequence to an encoded video data;
a feature encoding unit for encoding original pixel values of the reference video sequence and locations as an edge video sequence comprising information on the edge pixel values along with their location information; and
a communication unit for transmitting the encoded video data and the edge video sequence to a network.

22. A method of evaluating a video sequence at a receiver, comprising:
receiving video data and feature parameters that contain information on edge pixel values along with edge pixel location information within a reference video sequence, the video data generated through an encoding of the reference video sequence;
generating a received video sequence from the received video data and generating an edge video sequence from the feature parameters;
calculating a mean square error based on the difference between edge pixels values of the edge video sequence and corresponding pixels values of the received video sequence;
calculating an edge peak signal-to-noise ratio using the mean square error; and
performing a video quality evaluation based on the edge peak signal-to-noise ratio.

* * * * *